United States Patent
Damm et al.

(10) Patent No.: US 8,396,945 B2
(45) Date of Patent: Mar. 12, 2013

(54) NETWORK MANAGEMENT SYSTEM WITH ADAPTIVE SAMPLED PROACTIVE DIAGNOSTIC CAPABILITIES

(75) Inventors: Gerard Damm, Plano, TX (US); Timucin Ozugur, Fairview, TX (US)

(73) Assignee: Alcatel Lucent, Paris (FR)

( * ) Notice: Subject to any disclaimer, the term of this patent is extended or adjusted under 35 U.S.C. 154(b) by 681 days.

(21) Appl. No.: 11/530,531

(22) Filed: Sep. 11, 2006

(65) Prior Publication Data

US 2008/0065760 A1  Mar. 13, 2008

(51) Int. Cl.
G06F 15/16 (2006.01)
G06F 15/177 (2006.01)
G06F 15/173 (2006.01)
G06F 11/00 (2006.01)
G06F 9/00 (2006.01)
G06F 1/26 (2006.01)

(52) U.S. Cl. ........ 709/220; 709/207; 709/223; 709/224; 709/226; 370/216; 370/241; 370/252; 713/1; 713/320

(58) Field of Classification Search .......... None
See application file for complete search history.

(56) References Cited

U.S. PATENT DOCUMENTS

| | | | | |
|---|---|---|---|---|
| 2002/0194319 A1* | 12/2002 | Ritche | ............................ | 709/223 |
| 2003/0097619 A1* | 5/2003 | Parry | .............................. | 714/48 |
| 2004/0006603 A1* | 1/2004 | Haury | ........................... | 709/207 |
| 2005/0235273 A1* | 10/2005 | Travison et al. | ............... | 717/136 |
| 2006/0047995 A1* | 3/2006 | Schriek | .............................. | 714/2 |
| 2006/0112317 A1* | 5/2006 | Bartolini et al. | ................. | 714/47 |
| 2006/0117102 A1* | 6/2006 | Jeon | .............................. | 709/224 |
| 2006/0253553 A1* | 11/2006 | Burckart et al. | .............. | 709/220 |

FOREIGN PATENT DOCUMENTS

WO  WO/2006/120040  * 11/2006

* cited by examiner

*Primary Examiner* — Ario Etienne
*Assistant Examiner* — Ho Shiu
(74) *Attorney, Agent, or Firm* — Hitt Gaines, PC

(57) ABSTRACT

An operation is performed for executing a plurality of first-level queries. Execution of each first level query determines if a respective type of operational condition exists within a network. If needed due to the quantity of first-level queries, the first-level queries are executed in a sampled manner such that less than all of the first-level queries are applied to a specified collection of network elements of the network during each one of a plurality of instances of executing the first-level queries being performed and such that all of the first-level queries are applied to the specified collection of network elements in accordance with a prescribed query execution timeframe. An operation is performed for executing a second-level query in response to one of the first-level queries determining that the respective type of operational condition exists within the network. Executing the second-level query results in determination of diagnostic information specific to the determined type of operational condition.

14 Claims, 5 Drawing Sheets

NETWORK MANAGEMENT SYSTEM WITH ADAPTIVE SAMPLED PROACTIVE DIAGNOSTIC CAPABILITIES

FIELD OF THE DISCLOSURE

The disclosures made herein relate generally to network management systems and, more particularly, to diagnostic capabilities of network management systems.

BACKGROUND

It is important for service providers who offer services using a network to monitor the network for any operational condition that has the potential for causing degradation of the quality of service in a customer application. Internet Protocol Television (IPTV) is an example of such a customer application. Accordingly, service providers emphasize the need for testing procedures of customer applications. This need for testing procedures of customer applications is particularly important and desired when such customer applications rely on new technologies such as Virtual Private LAN Services (VPLS) in the network layer.

When new network technologies such as VPLS or new services such as IPTV are integrated into a network, service providers face the challenge of not fully understanding the impact that such new network technologies and/or services are going to have on the network. In their first iterations, new network technologies usually include management and OAM (Operations, Administration and Maintenance) tools for basic troubleshooting (i.e., basic diagnostic tools). These basic diagnostic tools are typically of an out-of-band type (e.g., Management Information Base (MIB) queries, etc) and/or in-band type (e.g., fault detection with connectivity checking mechanisms, fault verification with ping-like mechanisms, fault localization with Traceroute-like mechanisms, etc). Following introduction of new network technologies, more advanced diagnostics tools need to be defined and are of great value for the network administrators. These more advanced diagnostic tools are useful for both problem solving and for verification of operational networks. Furthermore, due to their advanced capabilities, these advanced diagnostic tools remain useful even when usage of the new network technology becomes well established in networks.

Diagnostics tools provide for verification of node configuration, traffic mapping, data paths, virtual circuits and the like. In an ideal world, there would be no need for verification tools. But, errors do happen (e.g., human error, protocol error, software bug, hardware defect, etc) and tools to identify, locate, prevent, and catch these errors are always needed. Immediately after a network initial activation or a reset, a network operator may want to verify essential network configuration settings. During normal operations, the network operator will also be interested in more subtle operational conditions, which don't result in obvious service interruption, but rather in service degradation or, potentially, future service interruption. In the specific case of VPLS, diagnostic verifications encompass multiple nodes (e.g., possibly all the edge nodes of a VPLS instance) and multiple layers (e.g., VPLS, Ethernet, pseudo-wires, tunnelling mechanisms). The problem of VPLS-wide verifications is one application-specific example of where such diagnostic tools are needed. However, the same problem exists for most, if not all, network technologies.

Various approaches are known for providing diagnostic tools that are useful for problem solving and verification in operational networks. Out-of-band queries are one such known approach. As shown in FIG. 1 (prior art), out-of-band queries are issued from a NMS (Network Management System) via, for example, Simple Network Management Protocol (SNMP) or Common Management Interface Protocol, Common Management Information Service Element (CMIP/CMISE) for reception by a plurality of Provider Edge nodes (PE). Examples of such Provider Edge nodes include, but are not limited to, routers, bridges, servers and the like. These out-of-band queries are efficient in their ability to retrieve configuration information from a node, provided the corresponding MIB contains the desired information. However, this approach can become tedious if many parameters from many nodes are needed for a particular question. To reduce the tedium, out-of-band queries can be scripted to automate the retrieval process, but such scripting does not address other drawbacks of MIB queries. Examples of such other drawbacks include, but are not limited to, the fact that a datapath is not itself tested and the fact that some data may not be present in the MIBs (e.g., like entries in forwarding tables used in the datapath). Furthermore, while out-of-band queries are on-demand by nature, it is disclosed herein that a pro-active solution can be based on them. Another shortcoming of out-of-band queries is that the network management systems for various operator-owned nodes are not necessarily integrated, which means that troubleshooting a certain network path, route or circuit may involve several nodes that are not managed by the same NMS. Therefore, a network administrator performing such troubleshooting must have access to all of these network management systems, which is often not convenient, efficient or practical.

FIG. 2 (prior art) shows an alternate approach for implementing out-of-band diagnostics. This approach relies upon reservation of a portion of the network bandwidth for control data. A shortcoming of this approach is that it does not test the actual datapath between the Provider Edge nodes (PE).

An in-band OAM approach for network diagnostic, which relies on OAM fault management messages, sends OAM fault messages on the same channels as user data without reservation of a separate control channel. As shown in Table 1 (prior art), each network layer has its in-band fault management mechanism (e.g., set of OAM messages), which normally follows the same formal diagnostic protocol (e.g., pro-active detection, on-demand verification, on-demand localization, etc). Connectivity is tested in this diagnostic protocol by pro-actively sending repeatedly a stream of periodical Hello messages. Nodes expect to receive Hello messages from their neighbors. An absence of reception of these messages is interpreted as loss of connectivity. In Ethernet context, these Hello messages are referred to as Connectivity Checking messages. A layer may include its own mechanism for issuing Hello Messages or may use a separate mechanism such as, for example, Bi-directional Forwarding Detection (BFD). To verify that a problem reported by a Hello mechanism is tested in this diagnostic protocol, a network operator uses an on-demand ping-like tool to perform such verification. In Ethernet context, such an on-demand ping-like tool is referred to as LoopBack. In PW (Pseudo Wire) context, such an on-demand ping-like tool is referred to as VCCV (Virtual Circuit Connection Verification). A ping message is sent along a datapath, and a reply is sent along the return datapath. If a problem has been confirmed by a Ping mechanism, the network operator attempts to locate the exact node or link that has a problem using a Traceroute-like mechanism (called LinkTrace in Ethernet context).

TABLE 1

Existing in-band fault management mechanisms

| | Connectivity (Detection) | | Ping (Verification) | Traceroute (Localization) |
|---|---|---|---|---|
| | data path | control path | | |
| IP | BFD | IGP/BGP Hello | ICMP Ping | ICMP Traceroute |
| Eth last mile | 802.3ah | | — | — |
| Eth Provider | 802.1ag/Y.1731 CC | | LoopBack | LinkTrace |
| VPLS | — | — | (VPLS ping/TR, Eth level, .1ag-like, proprietary implementations (MAC ping)) | |
| PW | BFD, Y.1711 | LDP Hello | VCCV | — |
| MPLS tunnel | BFD, Y.1711, Y.1713 | LDP/RSVP Hello | LSP Ping | LSP Traceroute |
| data link | (liveliness, keepalive, local management interfaces, ...) | | — | — |

These known fault management mechanisms are efficient for their task of reporting and locating a connectivity problem, even along paths and nodes not managed by a single NMS. But, they do not help finding the existence and root cause of other problems. They can be extended for other uses such as, for example, piggybacking timestamps for delay measurements. Also, they are normally used in a point-to-point scenario, except for Ethernet CC, which is natively broadcast. As shown in FIG. 3 (prior art), a network operator usually has to launch a succession of point-to-point tests to test multipoint data paths between the Provider Edge nodes (PE).

FIG. 4 (prior art) shows a modified approach for implementing OAM and on-demand diagnostics. This approach includes piggy-backing other requests and replies on a Ping mechanism, and forces a parallel broadcast instead of a sequential series of point-to-point queries between the provider edge nodes (PE). With respect to piggy-backing, most Ping mechanisms allow for such functionality via extensions (e.g., TLVs: Type Length Value extensions). This modified approach is referred to herein as VPLS In-band Configuration Verification (VICV). VICV is an on-demand tool, and does not provide any desired pro-active diagnostics service.

As shown in FIG. 5 (prior art), multipoint in-band OAM such as VICV can be made recursive so that a Provider Edge node (PE) or a Multi-Tenant Unit (MTU) propagates the piggy-backed requests as long as it is not an edge toward the customers. In this manner, multipoint in-band OAM is compatible with Hierarchical VPLS (H-VPLS).

Discovery protocols in the IP layer are another approach for implementing network diagnostic. Examples of these discovery protocols include, but are not limited to, Link Layer Discovery Protocol 802.1ab (LLCP), Neighbor Discovery Protocol (NDP), or Border Gateway Protocol BGP Hello (BGP Hello). These discovery protocols are normally used for signalling and routing (e.g., recomputing and advertising forwarding tables, establishing correspondence between physical and logical addresses, etc). They are sometimes used indirectly for some configuration verification and diagnostics. However, by nature, they are limited to one-hop neighbors and do not perform all the configuration verifications (even locally) that are generally needed for a complete diagnostics solution.

Concepts for more sophisticated approaches for network management and diagnostics have been touched upon for some time. More specifically, sophisticated methods include correlation analysis whether deterministic (e.g., intelligent agents, expert systems, rule-based, etc) or probabilistic (heuristics, Bayesian inference, fuzzy logic, etc). The input data for such correlation analysis usually includes sets of MIB queries, regular active monitoring (i.e. connectivity) and/or active performance measurement (e.g., delay, delay variation, losses). Active monitoring of configuration has been proposed in other contexts (e.g., robotics, automated systems in factories, camera-based security systems, power networks, etc.), but not specifically in telecommunication network management. The problem with these more sophisticated approaches is that they focus on performance-related analysis and do not look into misconfiguration-related problems such as, for example, potential problems with a traffic class that has not crossed the network yet or with a path that has not been used yet, suboptimal forwarding of current traffic, etc. When they rely on proactive measurement, it is limited to performance metrics and the sampling does not consider the constraint of complete coverage whereby it would make sure that eventually all the nodes, paths, and criterions were measured and tested.

Therefore, network diagnostics functionality that is useful for problem solving and verification of operational networks and that overcomes shortcomings associated with conventional approaches for facilitating network management and diagnostics would be advantageous, desirable and useful.

SUMMARY OF THE DISCLOSURE

In one embodiment of the present invention, a method comprises a plurality of operations for facilitating network diagnostic functionality. An operation is performed for executing a plurality of first-level network diagnostic queries. The first-level network diagnostic queries each determine if a respective prescribed type of operational condition exists within a network. An operation is performed for executing one or more of a plurality of the second-level network diagnostic queries in response to one of the first-level network diagnostic queries determining that the respective prescribed type of operational condition exists within the network. Executing the one or more second-level network diagnostic query results in determination of diagnostic information specific to the respective prescribed type of operational condition corresponding to the first-level network diagnostic query that identified existence of the operational condition.

In another embodiment of the present invention, a network management system comprises instructions for facilitating network diagnostic functionality. Instructions are provided for executing a plurality of first-level network diagnostic queries. The first-level network diagnostic queries each determine if a respective prescribed type of operational condition exists within a network. Executing the plurality of first-level network diagnostic queries includes executing the first-level network diagnostic queries in a sampled manner. One aspect of executing the first-level network diagnostic queries in a sampled manner is that, if necessary due to a large quantity of first-level network diagnostic queries, less than all of the first-level network diagnostic queries are applied to a specified collection of network elements of the network during each one of a plurality of instances of executing the plurality of first-level network diagnostic queries being performed. Another aspect of executing the first-level network diagnostic queries in a sampled manner is that all of the first-level network diagnostic queries are applied to the specified collection of network elements in accordance with a prescribed query execution timeframe, which is important if all of the first-level queries are not executed at the same time. Instructions are provided for executing at least one of a plurality of the second-level network diagnostic queries in response to one of the first-level network diagnostic queries determining that the respective prescribed type of operational condition exists within the network. Executing the at least one second-level network diagnostic query results in determination of diagnostic information specific to the respective prescribed type of operational condition corresponding to the one first-level network diagnostic query.

In another embodiment of the present invention, a network diagnostic tool comprises a plurality of first-level network diagnostic queries, a plurality of second-level network diagnostic queries and a plurality of algorithms. The plurality of first-level network diagnostic queries are each configured for determining if a respective prescribed type of operational condition exists within a network. The first-level network diagnostic queries are executed in a rate-controlled manner such the first-level network diagnostic queries are issued for execution at a rate whereby such issuance rate does not cause unacceptable network resource utilization as a result of execution of the first-level network diagnostic queries. The plurality of second-level network diagnostic queries are each configured for determining diagnostic information specific to the respective prescribed type of operational condition corresponding to at least one of the first-level network diagnostic query. Each one of the algorithms is associated with a respective one of the first-level network diagnostic queries such that, in response to one of the first-level network diagnostic queries determining that the respective prescribed type of operational condition exists within the network, an algorithm associated with the first-level network diagnostic query that identified existence of the operation condition automatically implements execution of at least one of the second-level network diagnostic queries that is configured for determining diagnostic information specific to the respective prescribed type of operational condition.

The present invention provides a scheme for facilitating pro-active diagnostics of networks. Manual (or on-demand) diagnostic tools are activated typically through human interaction on a CLI (Command Line Interface) or a GUI (Graphical User Interface). In contrast, automatic (i.e., pro-active) diagnostic tools are activated and can be stopped. In active mode, they keep performing a certain task and may report alarms in case of detected prescribed operational conditions. The present invention does not introduce or reply upon any new protocols. Furthermore, there is no mandatory need for standardization to deploy embodiments of the present invention, because the present invention would be implemented in the NMS and/or network nodes. However, one embodiment of the present invention makes use of existing OAM messages with an extension (e.g., addition of specific Type-Length-Value fields (TLVs)) that could be proposed for standardization to ensure that such an OAM messaging scheme would work in an heterogeneous network.

Turning now to specific aspects of the present invention, in at least one embodiment, executing the plurality of first-level network diagnostic queries includes executing the first-level network diagnostic queries in a sampled manner.

In at least one embodiment of the present invention, one aspect of executing the first-level network diagnostic queries in a sampled manner is that, if necessary due to a large quantity of first-level network diagnostic queries, less than all of the first-level network diagnostic queries are applied to a specified collection of network elements of the network during each one of a plurality of instances of executing the plurality of first-level network diagnostic queries being performed and another aspect of executing the first-level network diagnostic queries in a sampled manner is that all of the first-level network diagnostic queries are applied to the specified collection of network elements in accordance with a prescribed query execution timeframe.

In at least one embodiment of the present invention, the prescribed query execution timeframe is a prescribed duration of time.

In at least one embodiment of the present invention, executing the plurality of first-level network diagnostic queries includes the plurality of first-level network diagnostic queries being automatically implemented under control of a network management system of the network.

In at least one embodiment of the present invention, executing one or more second-level network diagnostic query includes accessing an algorithm associated with the first-level network diagnostic query that identified existence of the operation condition and performing the one or more second-level network diagnostic query in accordance with the algorithm.

In at least one embodiment of the present invention, executing the plurality of first-level network diagnostic queries includes performing the first-level network diagnostic queries in a first sequence during a first execution instance and performing the first-level network diagnostic queries in a second sequence different than the first sequence during a second execution instance thereby limiting the potential for a certain one of the first-level network diagnostic queries being synchronized with a periodically recurring network traffic pattern during consecutive execution instances of the first-level network diagnostic queries.

In at least one embodiment of the present invention, rate-controlled execution of the first-level queries includes facilitating execution of the first-level network diagnostic queries in a sampled manner such that less than all of the first-level network diagnostic queries are applied to a specified collection of network elements of the network during each one of a plurality of instances of the executing the plurality of first-level network diagnostic queries being performed and such that all of the first-level network diagnostic queries are applied to the specified collection of network elements in accordance with a prescribed query execution timeframe These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
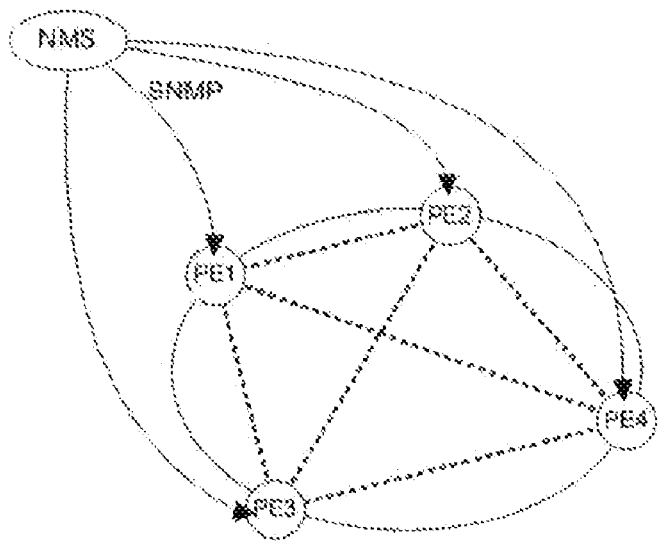
FIG. 1 is a diagrammatic view showing a prior art embodiment of out-of-band MIB queries.
Figure 2:
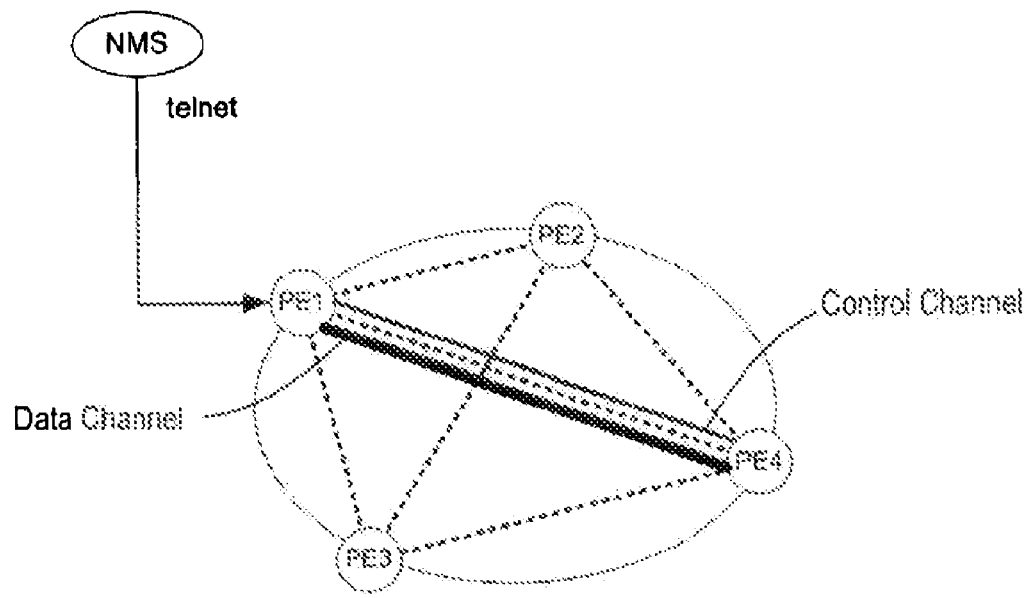
FIG. 2 is a diagrammatic view showing a prior art embodiment of out-of-band through reserved control channels.
Figure 3:
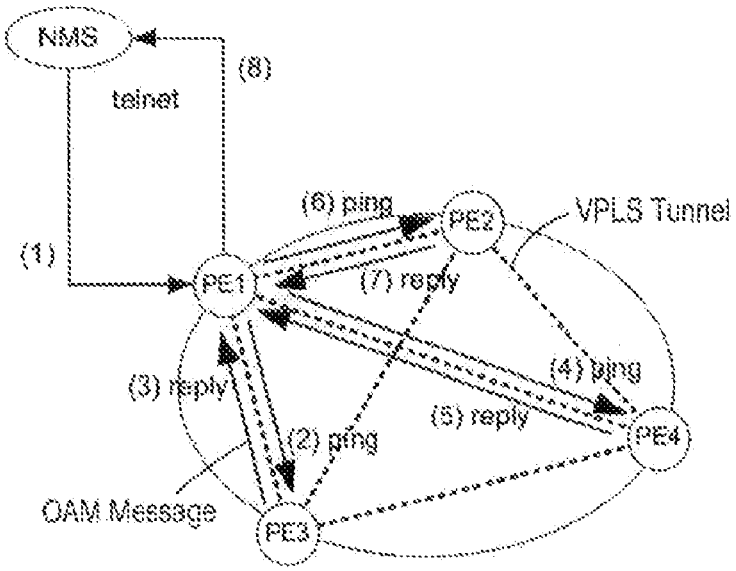
FIG. 3 is a diagrammatic view showing a prior art embodiment of a succession of point-to-point in-band OAM tests.
Figure 4:
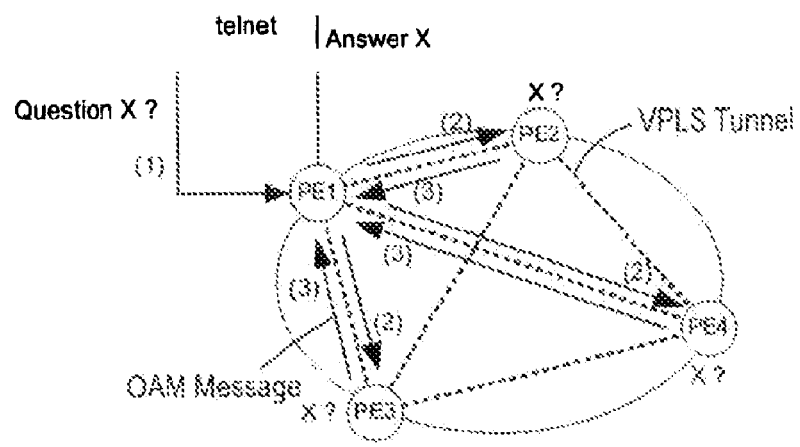
FIG. 4 is a diagrammatic view showing a prior art embodiment of VPLS in-band configuration verification using in-band OAM messages, representing an example of multipoint OAM tests.
Figure 5:
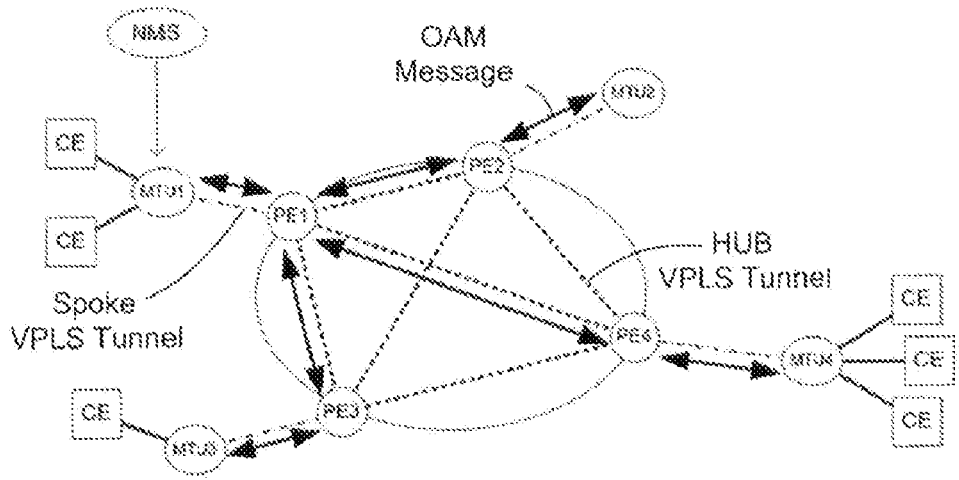
FIG. 5 is a diagrammatic view showing a prior art embodiment of usage of hierarchical VPLS using VPLS in-band configuration verification.

Network diagnostic functionality in accordance with the present invention provide utility that is not provided for by conventional approaches for providing network diagnostics functionality using MIB queries (i.e., scripted or not) and piggybacked in-band OAM (i.e., point-to-point or multipoint). Embodiments of the present invention include a plurality of queries and algorithms that are executed automatically over a network. The queries can be either in-band or out-of-band, and can be configuration-oriented or performance-oriented, as needed. Moreover, the amount of issued queries is controlled, so that it remains small.

In accordance with the present invention, a set of first-level network diagnostic queries (i.e., first-level queries) and a set of second-level queries (i.e., second-level queries) are provided. The first-level queries identify possible network configuration and performance problems. One or more second-level queries are executed only when a corresponding one of the first-level queries has exposed a possible prescribed operational condition. Accordingly, the first-level queries and the second-level queries jointly define a hierarchical query structure.

The first-level queries are executed on a permanent basis, but with sampling for achieving scalability. The sampling is done with the constraint that over a finite deterministic amount of time, all the first-level diagnostics verifications have been executed over all of the network elements (i.e., all nodes, all virtual connections, all customers, etc must eventually be tested). Also, a degree of randomness is introduced to query issuance so that the first-level queries avoid following verification patterns, which could get synchronized with existing network traffic patterns and, thereby, possibly result in certain first-level queries periodically colliding with heavy traffic.

Each one of the second-level queries is executed in accordance with at least one of a plurality of pre-defined algorithms and each one of the pre-defined algorithms is associated with one of the first-level queries. The algorithms and second-level queries are jointly configured so that the algorithms carry out a respective one or ones of the second-level queries in manner than efficiently utilizes network resources in implementing the algorithms and second-level queries and that limits the response time in implementing the algorithms and second-level queries. More specifically, only those second-level queries that need to be executed are executed by the algorithm. In a preferred implementation of the present invention, the algorithms are based on deterministic approaches such as, for example, procedural languages and/or rule-based systems. However, the algorithms may also be based on other types of approaches such as, for example, probabilistic approaches.

Accordingly, network diagnostic functionality in accordance with the present invention is pro-active because the diagnostic queries (first-level and second-level) are executed automatically under the control of a NMS without human intervention. Furthermore, network diagnostic functionality in accordance with the present invention is sampled because the first-level queries are executed sparsely (if necessary) so as to reduce burden on network resources (e.g., processing and bandwidth capacity). Still furthermore, it is adaptive because the second-level queries are executed in accordance with an automatically initiated algorithm that is accessed and performed based on an outcome of one or more different queries. In combination, network diagnostic functionality in accordance with the present invention is adaptive, sampled and proactive (i.e., adaptive sampled proactive network diagnostic functionality).

Diagnostic results generated by execution of the queries and algorithms are delivered to an entity such as, for example, a network administrator. Examples of such diagnostic results include, but are not limited to, one or more characterized alarms, one or more or notifications of potential problems or misconfigurations, and the like. The diagnostic results either pinpointed an identified prescribed operational condition right away or circumscribe it well enough so that the entity to which the diagnostic results have been delivered (e.g., a network administrator) can easily finish pinpointing the prescribed operational condition manually and then proceed to resolve it.

Discussed now is a specific embodiment of an algorithmic approach for implementing network diagnostic functionality in accordance with the present invention. This specific example focuses on VPLS. However, as mentioned above, network diagnostic functionality in accordance with the present invention is applicable to other network technologies besides VPLS and to other customer applications besides IPTV.

The algorithmic approach for implementing network diagnostic functionality in accordance with the present invention includes defining a set of first-level queries $\{H(i)\}$, which are also referred to herein as first-level network diagnostic queries. Examples of the first-level queries include, but are not limited to, out-of-band MIB queries, specially configured in-band OAM queries (e.g., traditional point-to-point or forced multipoint broadcast such as VICV). The first-level queries can be of any nature.

For each first-level query $H(i)$, a set of second-level queries $\{Q(i,j)\}$ is defined as well as an algorithm $A(i)$. Each algorithm $A(i)$ procedurally invokes the second-level queries $Q(i,j)$ dependent upon an outcome of the associated first-level query $H(i)$. Like the first-level queries, the second-level queries $Q(i,j)$ can be of any type. Additionally, some of the algorithms $A(i)$ can be shared between two or more first-level queries $H(i)$. In the case of VPLS, the queries would correspond to VPLS-related concerns such as, for example, (C-VLAN,port) mapped to a VSI, (VSI,PW) binding, C-VLAN tag handling in a PW (e.g., PW type, PW mode, VLAN mode), Ethernet FDB entries, etc. The Provider Edge nodes involved in a VPLS (i.e., PEs and MTUs) are enhanced, if necessary, to support all of the first-level queries $H(i)$ and all of the second-level queries $Q(i,j)$. The provider NMS is enhanced to run a method for providing overall network diagnostic functionality in accordance with the present invention, which includes interdependent execution of the first-level queries $H(i)$, the second-level queries $Q(i)$ and the algorithms $A(i)$.

First-level and second-level queries in accordance with the present invention may be structured in any number of ways. In some cases, all or some of the queries focus firstly on configuration verification and secondly on performance measurement. In other cases, some queries provide for configuration verification while other queries provide for performance measurement. In still other cases, queries related to other diagnostic objective(s) besides configuration verification or performance measurement, or provide for a mix of any number of different diagnostic objectives.

In one embodiment of the presenting invention, the first-level queries are executed in a manner as represented by the following pseudo-code. The following pseudo-code addresses sampling functionality, randomization functionality, and second-level query algorithm functionality. In this manner, the first-level queries as executed in accordance with the following pseudo-code provide for network diagnostic functionality in accordance with the present invention.

EXAMPLE 1

First-Level Query Pseudo Code

```
loop
   under the constrained sampling&randomization&low-burden rule:
      pick a first-level query H(i)
      pick a context (C-VLAN, VSI, ingress PE/MTU/port, PW, ...)
      pick a start time t
   end
   launch query H(i) at time t
   if (H(i) reveals a potential or actual prescribed operational condition)
   then
      launch adaptive diagnostics algorithm A(i) in same context
   end if
end loop
```

Figure 6:
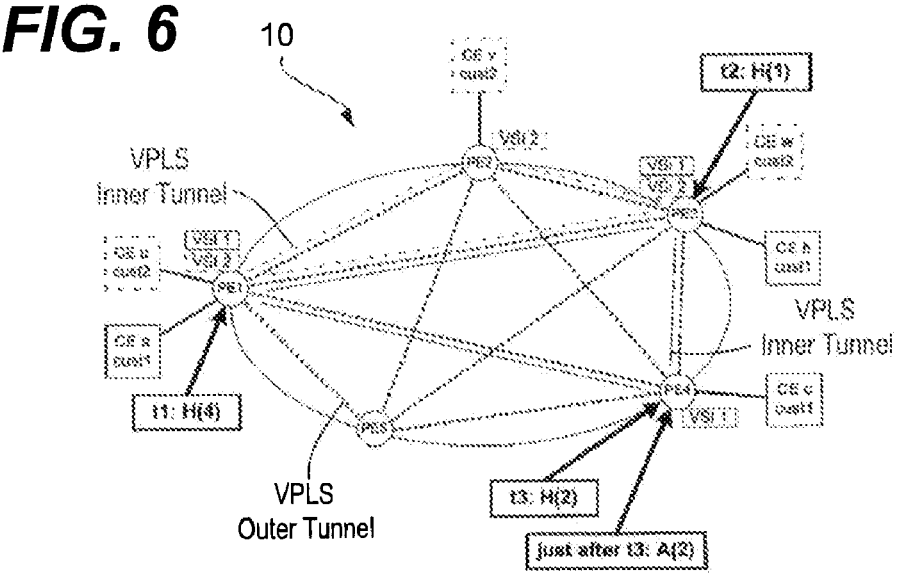
FIG. 6 is a diagrammatic view showing an embodiment of an approach for facilitating network diagnostics functionality in accordance with the present invention.

Referring now to FIG. 6, an example of network diagnostic functionality in accordance with the present invention as implemented for VPLS is shown. A provider network 10 includes 5 Provider Edge Nodes (PE1-PE5). Two customers (cust 1, cust 2) are shown, with VSI 1 used for the first customer (cust 1) and VSI 2 used for the second customer (cust 2).

At a first time t1, first-level query H(4) is launched (i.e., executed) from the first Provider Edge Node (PE1). An example of first-level query H(4) is an in-band point-to-point verification of the pseudo wire (PW) between the first Provider Edge Node (PE1) and the second Provider Edge Node (PE2) for VSI 2. The first-level query H(4) finds that this verification is satisfactory, so nothing else happens (i.e., execution of this current instance of first-level query H(4) ends). At a second time t2, first-level query H(1) is launched. An example of first-level query H(1) is an out-of-band MIB query to check the mapping of traffic of the first customer (cust 1) on VSI 1. First-level query H(1) reveals a prescribed operational condition does not exist, so nothing else happens (i.e., execution of this current instance of the first-level query H(1) ends). At a third time t3, first-level query H(2) is launched from the fourth Provider Edge node (PE4) and finds that customer frames with C-VLAN tag 14 cannot reach customer equipment (CE a), which is attached to PE1, whereas they are supposed to. For example, perhaps, no Cust1 C-VLAN 14 frames have been sent over the network yet, so a prescribed operational condition has not been detected yet by other means. An example of first-level query H(2) is an in-band multipoint verification of the reach of C-VLAN 14 from Customer 1. Immediately after, first-level query H(2) finds that customer frames with C-VLAN tag 14 cannot reach customer equipment (CE a), algorithm A(2) corresponding to first-level query H(2) is initiated by first-level query H(2). Algorithm A(2) analyses the prescribed operational condition more deeply via one or more second-level queries, thereby attaining more informational details prior to reporting results of the diagnostic analysis to a network administrator. Thus, in a police metaphor, the sampled first-level queries would correspond to a "patrolling" mode while the adaptive second-level queries would correspond to a "hot pursuit" mode.

Figure 7:
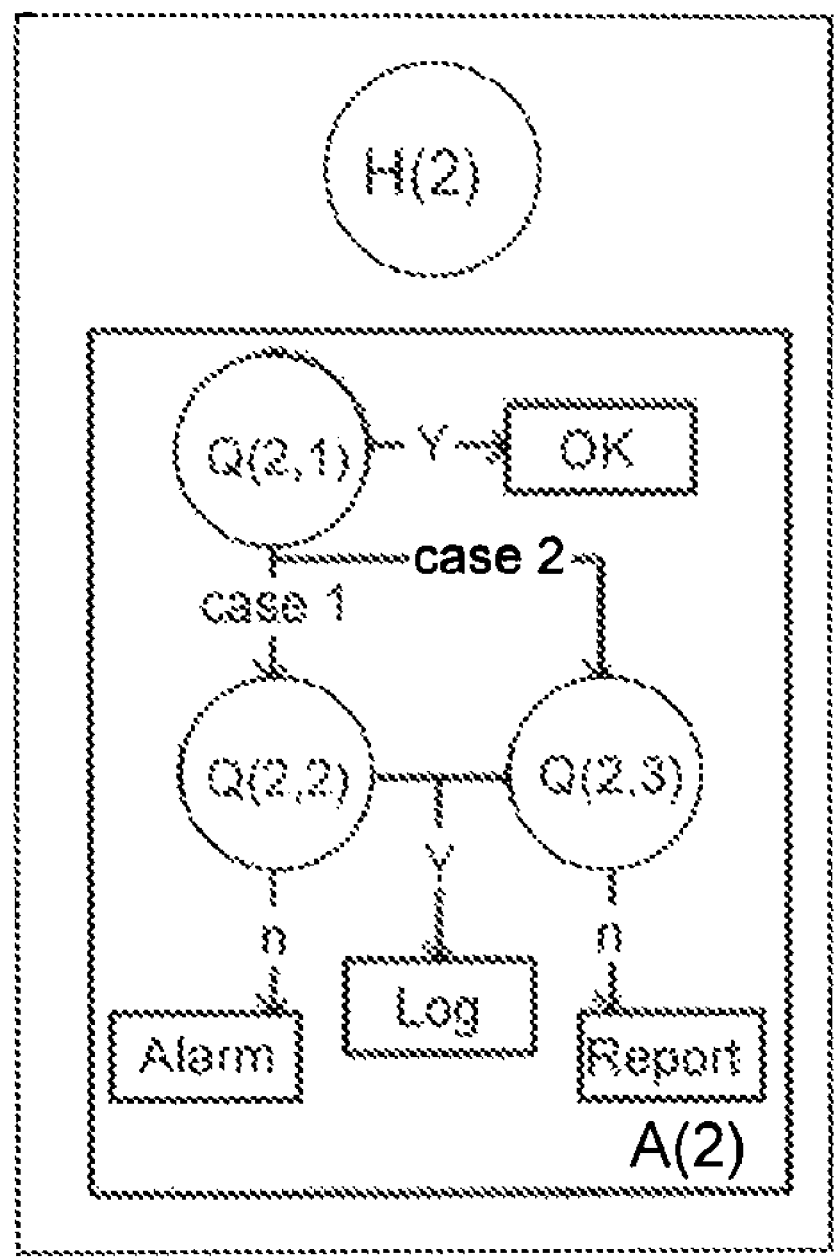
FIG. 7 is a diagrammatic view showing an embodiment of an algorithm in accordance with the present invention.

FIG. 7 shows an embodiment of algorithm A(2) referenced in FIG. 6. Referring to FIGS. 6 and 7, in the case of algorithm A(2), second-level queries Q(2,1), Q(2,2), and Q(2,3) are accessed and performed for providing a detailed investigation of the operational condition revealed by first-level query H(2). Second-level query Q(2, 1) verifies that C-VLAN 14 is being configured currently in another NMS session with either the fourth Provide Edge node (PE4) or the first Provider Edge node (PE1). If not, there could be two cases: first-level query H(2) found a prescribed operational condition in the corresponding Pseudo Wire (PW) tunnel between PE4 and PE1, or first-level query H(2) found a prescribed operational condition in one of the Provider Edge nodes (PE4 or PE1). Second-level query Q(2,2) specifically tests the datapath on the PW tunnel and either logs the action if the prescribed operational condition is not confirmed or sends an alarm to the NMS. An example of such an alarm (i.e., message) includes "forwarding prescribed operational condition detected for the first customer (cust 1), in VSI 1, between the fourth Provider Edge node (PE4) and the first Provider Edge node (PE1), for C-VLAN 14, on the PW tunnel between the fourth Provider Edge node (PE4) and the first Provider Edge node (PE1)". Second-level query Q(2,3) specifically test the fourth Provider Edge node (PE4) and the first Provider Edge node (PE1), and either logs the action or sends a report of a possible misconfigurations that is subsequently acted on by the network administrator for the purpose of verifying the prescribed operational condition.

It is disclosed herein that embodiments of the present invention can be implemented, for example, on a policy-based infrastructure. Such embodiments would include queries and algorithms that are stored in a policy database and that are executed through a NMS and OAM messages.

In implementing embodiments of the present invention, the need to develop solution-specific software functions in the control plane of the nodes may be needed. Such solution-specific software functions would serve the function of initiating and/or processing specialized in-band OAM pings or Traceroute messages when queried (i.e., either point-to-point or multipoint). Furthermore, if needed, implementing embodiments of the present invention may necessitate the need for new MIB entries to be developed. Still further, implementing embodiments of the present invention may necessitate extension of the NMS to implement the first-level query sampling and adaptive (i.e., ad-hoc) algorithm activation. Finally, the set of queries and algorithms must be developed or an infrastructure to enable their development by the operator must be provided.

It is disclosed herein that queries and algorithms in accordance with the present invention may be provided for in any number of ways. In one embodiment, a predefined instantiation of the first-level queries, the second-level queries and algorithms is provided. Such an embodiment serves as a ready-to-use solution that can be provided to a network operator wanting a turnkey system. Optionally, such predefined instantiation of the first-level queries, the second-level queries and algorithms may be templates that are customizable by an end user. In another embodiment, a software/hardware framework is provided for enabling specification and deployment of queries and algorithms. This software/hardware framework represents a programmable solution that can be provided to a network operator thereby enabling the network operators to write their own customized pro-active diagnostics.

Embodiments of the present invention automate diagnostics tasks, thus allowing service providers an easier way to manage their networks. Embodiments of the present invention operate as watchdogs because they are pro-active. More potential problems (i.e., prescribed operational conditions) and misconfigurations can be identified with the systematic approach provided by the present invention than can be identified with a manual on-demand approach. Embodiments of the present invention enhance the quality of diagnostics in a network because the first-level queries allow a better characterization of the issue as opposed to, for example, just an undocumented alarm and because sampling of first-level queries and the conditional execution of second-level queries ensure that implementation of the present invention remains scalable (i.e., prevents issuance of too many queries).

Figure 8:
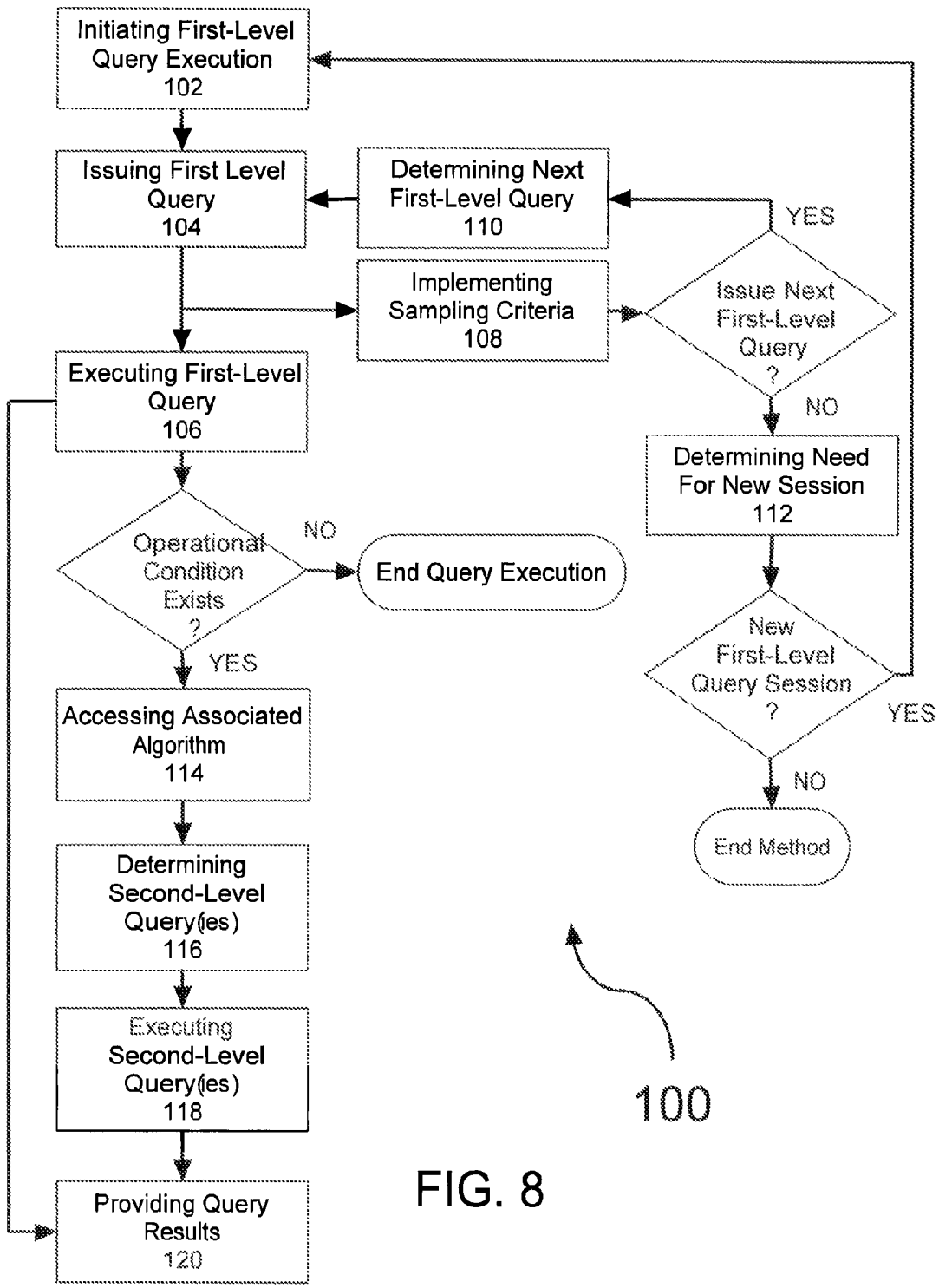
FIG. 8 is a flow chart showing an embodiment of a method for facilitating network diagnostics functionality in accordance with the present invention.

FIG. 8 shows an embodiment of a method for facilitating network diagnostic functionality in accordance with the present invention, which is referred to herein as the method 100. The method 100 is configured for providing network diagnostic functionality in accordance with the present invention. More specifically, the method 100 facilitates execution of first-level queries, second-level queries and algorithms in accordance with the present invention.

The method 100 begins with an operation 102 for initiating first-level query execution. Such initiation includes selecting one of a plurality of first-level queries (i.e., a current first-level query) to be implemented during a current execution instance for the first-level queries. It is disclosed herein that, alternatively, such initiation includes selecting two or more of the plurality of first-level queries (e.g., two or more current first-level queries) to be implemented during the current execution instance for the first-level queries. An operation 104 is performed for issuing the current first-level query for being executed on the network in response to the operation 102 being performed for initiating first-level query execution. Such issuing includes sending the current first-level query to a network element that will be executing the query. Examples of such network elements capable of executing queries include physical network nodes and network management systems. After the current first-level query is issued, an operation 106 is performed for executing the current first-level query.

As discussed above, network diagnostic functionality in accordance with the present invention includes sampled and randomized components. To this end, the method 100 provides for such sampling and randomization. Sampling provides for only a subset of the plurality of first-level queries to be issued in any one execution instance (if necessary, due to the concern of not overloading resources) and randomization serves to limit the potential for an order of execution of the first-level queries being synchronized with a recurring traffic pattern. In response to or after performing the operation for issuing the current first-level query, an operation 108 is performed for implementing sampling criteria. Implementing the sampling criteria serves the purpose of determining if another first-level query needs to be issued for execution in the current execution instance for the first-level queries. Examples of such sampling criteria include, but are not limited to, what queries have already been run in the current execution instance for the first-level queries, a remaining portion of a duration of time for executing all of the first-level queries in the current execution session and what first-level query was most recently issued and/or executed.

One aspect of executing the first-level network diagnostic queries in a sampled manner is that, if necessary due to a large quantity of first-level network diagnostic queries, less than all of the first-level network diagnostic queries are applied to a specified collection of network elements of the network during each one of a plurality of instances of executing the plurality of first-level network diagnostic queries being performed. Another aspect of executing the first-level network diagnostic queries in a sampled manner is that all of the first-level network diagnostic queries are applied to the specified collection of network elements in accordance with a prescribed query execution timeframe, which is important if all of the first-level queries are not executed at the same time. Sampling of first-level queries is implemented only if there is a need to avoid unacceptable adverse impact on network resource utilization (e.g., network resource overload) as a result of execution of the first-level queries. If essentially simultaneous execution of all of the first-level queries does not result in an unacceptable adverse impact on network resource utilization, there is no need to rate-control issuance and execution of the first-level queries via sampling. However, it should be noted that simultaneous issuance and/or execution of all of the first-level queries would typically result in an unacceptable adverse impact on network resource utilization (i.e., typically network resource overload), so there usually is a need for rate control via a mechanism such as sampling.

In response to implementation of the sampling criteria determining that another first-level query needs to be issued for execution, an operation 110 is performed for determining the next first-level query to be issued for execution. Such determination includes assessing sampling considerations and randomization considerations for achieving desired sampling and randomization objectives (i.e., only a subset of the plurality of first-level queries to be issued in any one execution instance if necessary and limiting the potential for an order of execution of the first-level queries being synchronized with a recurring traffic pattern). After the next first-level query is determined, the operation 104 is performed for issuing the next first-level query for execution. It is disclosed herein that an issue timeframe (i.e., when to issue the next first-level query) is determined by the operation of implementing sampling criteria, by the operation for determining the next first-level query and/or by the operation for issuing the first-level query.

In response to implementation of the sampling criteria determining that another first-level query does not need to be issued for execution, an operation 112 is performed for determining if a new first-level query session is required. In a preferred embodiment, criterion for such determination is whether all of the first-level queries have been performed in a current series of execution instances. If it is determined that the new first-level query session is required, the method 100 continues at the operation 102 where a new first-level query session is initiated. Otherwise, the method ends after execution of any in-process queries is completed.

Returning now to the operation 106 for executing the current first-level query, such execution determines if a prescribed operational condition exists. Examples of such operation conditions include, but are not limited to conditions relating to configuration verification, conditions relating to performance measurement and/or other diagnostic objectives. If it is determined that such operational condition does not exist, second-level query execution for the current first-level query ends. If it is determined that such operational condition does exist, an operation 114 is performed for accessing an algorithm associated with the current first-level query. In response to accessing the associated algorithm, an operation 116 for determining one or more second-level queries to execute is performed by the associated algorithm. As discussed above, the second-level queries serve the purpose of gathering additional information (e.g., more detailed information) relating to the operation condition determined to exist by the current first-level query. Thereafter, an operation 118 is performed for executing the one or more second-level queries and an operation 120 is performed for providing the results of the one or more second-level queries. Examples of providing the results of the one or more second-level queries include, but are not limited to, outputting a printed hardcopy containing information gathered by the current first-level query and the second-level query, transmitting an electronic message containing information gathered by the current first-level query and the second-level query, displaying such information and/or saving such information to a file.

Referring now to instructions processible by a data processing device, it will be understood from the disclosures made herein that methods, processes and/or operations adapted for carrying out network diagnostic functionality as disclosed herein are tangibly embodied by computer readable medium having instructions thereon that are configured for carrying out such functionality. In one specific embodiment, the instructions are tangibly embodied for carrying out the method 100 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the presenting invention include a compact disk, a hard drive, RAM or other type of storage apparatus that has imaged thereon a computer program (i.e., instructions) adapted for carrying out network diagnostic functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating network diagnostic capabilities, comprising:

automatically sending a plurality of first-level network diagnostic queries from a first network element to other network elements, wherein said first-level network diagnostic queries each determine if a respective prescribed type of operational condition exists within the network, wherein said first-level network diagnostic queries are sent in a rate-controlled manner such that said first-level network diagnostic queries are issued for execution at a rate whereby such issuance rate does not cause unacceptable network resource utilization as a result of execution of said first-level network diagnostic queries, and wherein said sending the plurality of first-level network diagnostic queries includes executing said first-level network diagnostic queries in a sampled manner such that less than all of said first-level network diagnostic queries are applied to a specified collection of network elements of the network during each one of a plurality of instances of said executing the plurality of first-level network diagnostic queries being performed and such that all of said first-level network diagnostic queries are applied to the specified collection of network elements in accordance with a prescribed query execution timeframe; and executing at least one of a plurality of said second-level network diagnostic queries in response to one of said first-level network diagnostic queries determining that the respective prescribed type of operational condition exists within the network, wherein executing said at least one second-level network diagnostic query results in determination of diagnostic information specific to the respective prescribed type of operational condition corresponding to one of said first-level network diagnostic queries, wherein said sending the plurality of first-level network diagnostic queries includes:

performing said first-level network diagnostic queries in a first sequence during a first execution instance, and;

performing said first-level network diagnostic queries in a second sequence different than the first sequence during a second execution instance thereby limiting the potential for a certain one of said first-level network diagnostic queries being synchronized with a periodically recurring network traffic pattern during consecutive execution instances of said first-level network diagnostic queries.

2. The method of claim 1 wherein said first-level network diagnostic queries are used to identify at least one of a possible network configurations problem and a possible performance problem.

3. The method of claim 1 wherein the prescribed query execution timeframe is a prescribed duration of time and wherein executing said at least one second-level network diagnostic query involves sending said at least one second-level network diagnostic query from the first network element to at least one other a network element where the prescribed type of operational condition exists after said first-level diagnostic queries have determined that the respective prescribed type of operational condition exists within the network at said network element.

4. The method of claim 1 wherein said sending the plurality of first-level network diagnostic queries includes the plurality of first-level network diagnostic queries being automatically implemented under control of a network management system of the network.

5. The method of claim 1 wherein executing said at least one second-level network diagnostic query includes accessing an algorithm associated with said one first-level network diagnostic query and performing said at least one second-level network diagnostic query in accordance with the algorithm.

6. The method of claim 1 wherein:

executing said at least one second-level network diagnostic query includes accessing an algorithm associated with said one first-level network diagnostic query and performing said at least one second-level network diagnostic query in accordance with the algorithm;

the prescribed query execution timeframe is a prescribed duration of time; and said executing the plurality of first-level network diagnostic queries includes the plurality of first-level network diagnostic queries being automatically implemented under control of a network management system of the network.

7. A network management system, comprising:
a non-transitory computer readable medium having instructions therein,
a processor, an operation thereof is directed by said instructions stored on said non-transitory computer readable medium, wherein said instructions include:
instructions for automatically sending a plurality of first-level network diagnostic queries from a first network element to other network elements, wherein said first-level network diagnostic queries each determine if a respective prescribed type of operational condition exists within the network and wherein , wherein said first-level network diagnostic queries are sent in a rate-controlled manner such that said first-level network diagnostic queries are issued for execution at a rate whereby such issuance rate does not cause unacceptable network resource utilization as a result of execution of said first-level network diagnostic queries, and wherein said sending the plurality of first-level network diagnostic queries includes executing said first-level network diagnostic queries in a sampled manner such that less than all of said first-level network diagnostic queries are applied to a specified collection of network elements of the network during each one of a plurality of instances of said executing the plurality of first-level network diagnostic queries being performed and such that all of said first-level network diagnostic queries are applied to the specified collection of network elements in accordance with a prescribed query execution timeframe; and
instructions for executing at least one of a plurality of said second-level network diagnostic queries in response to one of said first-level network diagnostic queries determining that the respective prescribed type of operational condition exists within the network, wherein executing said at least one second-level network diagnostic query results in determination of diagnostic information specific to the respective prescribed type of operational condition corresponding to said one first-level network diagnostic query,
wherein said instructions for sending the plurality of first-level network diagnostic queries includes:
instructions for performing said first-level network diagnostic queries in a first sequence during a first execution instance, and;
instructions for performing said first-level network diagnostic queries in a second sequence different than the first sequence during a second execution instance thereby limiting the potential for a certain one of said first-level network diagnostic queries being synchronized with an adverse component of a periodically recurring network traffic pattern during consecutive execution instances of said first-level network diagnostic queries.

8. The network management system of claim 7 wherein the prescribed query execution timeframe is a prescribed duration of time.

9. The network management system of claim 7 wherein said instructions for executing the plurality of first-level network diagnostic queries includes instructions for automatically implementing executing the plurality of first-level network diagnostic queries.

10. The network management system of claim 7 wherein said instructions for executing said at least one second-level network diagnostic query includes instructions for accessing an algorithm associated with said one first-level network diagnostic query and instructions for performing said at least one second-level network diagnostic query in accordance with the algorithm.

11. The network management system of claim 7 wherein:
said instructions for executing said at least one second-level network diagnostic query include instructions for accessing an algorithm associated with said one first-level network diagnostic query and instructions for performing said at least one second-level network diagnostic query in accordance with the algorithm;
the prescribed query execution timeframe is a prescribed duration of time; and
said executing the plurality of first-level network diagnostic queries includes the plurality of first-level network diagnostic queries being automatically implemented under control of a network management system of the network.

12. A network diagnostic tool stored on a non-transitory computer readable medium, wherein the medium comprising:
a plurality of first-level network diagnostic queries each configured for determining if a respective prescribed type of operational condition exists within a network, wherein said first-level network diagnostic queries are sent in a rate-controlled manner such that said first-level network diagnostic queries are issued for execution at a rate whereby such issuance rate does not cause unacceptable network resource utilization as a result of execution of said first-level network diagnostic queries, wherein said first first-level network diagnostic queries being sent include being executed in a sampled manner such that less than all of said first-level network diagnostic queries are applied to a specified collection of network elements of the network during each one of a plurality of instances of said executing the plurality of first-level network diagnostic queries being performed and such that all of said first-level network diagnostic queries are applied to the specified collection of network elements in accordance with a prescribed query execution timeframe, and wherein said first-level network diagnostic queries are sent from a first network element to other network elements, and wherein said first-level network diagnostic queries are automatically sent under control of a network management system of the network;
a plurality of second-level network diagnostic queries each configured for determining diagnostic information specific to the respective prescribed type of operational condition corresponding to at least one of said first-level network diagnostic query; and
a plurality of algorithms, wherein each one of said algorithms is associated with a respective one of said first-level network diagnostic queries such that, in response to one of said first-level network diagnostic queries determining that the respective prescribed type of operational condition exists within the network, said one algorithm associated with said one first-level network diagnostic query automatically implements execution of at least one of said second-level network diagnostic queries that is configured for determining diagnostic information specific to the respective prescribed type of operational condition corresponding to said one first-level network diagnostic query, wherein execution of the plurality of first-level network diagnostic queries includes:
  said first-level network diagnostic queries being executed in a first sequence during a first execution instance, and;
  said first-level network diagnostic queries being executed in a second sequence different than the first sequence during a second execution instance thereby limiting the potential for a certain one of said first-level network diagnostic queries being synchronized with a periodically recurring network traffic pattern during consecutive execution instances of said first-level network diagnostic queries.

13. The network diagnostic tool of claim 12 wherein the prescribed query execution timeframe is a prescribed duration of time.

14. The network diagnostic tool of claim 12 wherein said rate-controlled execution of the first-level queries includes facilitating execution of said first-level network diagnostic queries in a sampled manner such that less than all of said first-level network diagnostic queries are applied to a specified collection of network elements of the network during each one of a plurality of instances of said executing the plurality of first-level network diagnostic queries being performed and such that all of said first-level network diagnostic queries are applied to the specified collection of network elements in accordance with a prescribed query execution timeframe.

* * * * *